United States Patent [19]
Ueda

[11] Patent Number: 5,073,015
[45] Date of Patent: Dec. 17, 1991

[54] ZOOM LENS SYSTEM
[75] Inventor: Toshihiko Ueda, Toyokawa, Japan
[73] Assignee: Minolta Camera Kabushiki Kaisha, Osaka, Japan
[21] Appl. No.: 632,086
[22] Filed: Dec. 20, 1990
[30] Foreign Application Priority Data
 Dec. 26, 1989 [JP] Japan .................................. 1-337677
[51] Int. Cl.[5] ........................................... G02B 15/177
[52] U.S. Cl. .................................................. 359/680
[58] Field of Search .......................... 350/426; 359/751
[56] References Cited
 FOREIGN PATENT DOCUMENTS
 54-78150 6/1979 Japan .

Primary Examiner—Scott J. Sugarman
Attorney, Agent, or Firm—Price, Gess & Ubell

[57] ABSTRACT

A zoom lens system having a negative lens group which includes a negative lens having a concave surface facing the reducing side and a positive lens having a convex surface facing the enlarging side, and a positive lens group which includes a positive lens unit of at least one positive lens having a convex surface facing the enlarging side, a first lens having a concave surface facing the reducing side, a double convex lens, and a second lens having a concave surface facing the enlarging side, and wherein said zoom lens system is standardized by the conditional expression so that the pupil position on the reducing side approaches the image point on the reducing side.

3 Claims, 7 Drawing Sheets

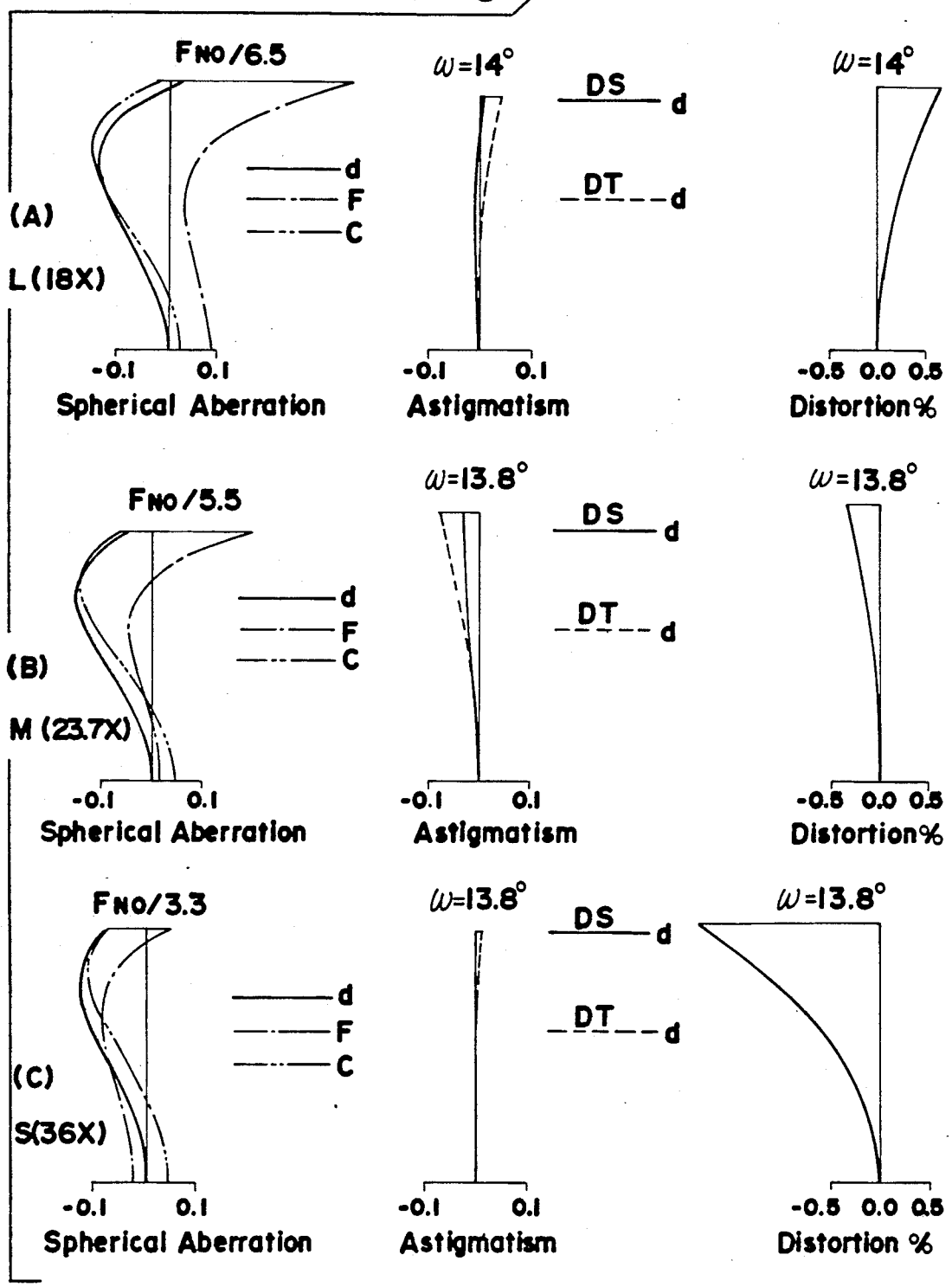

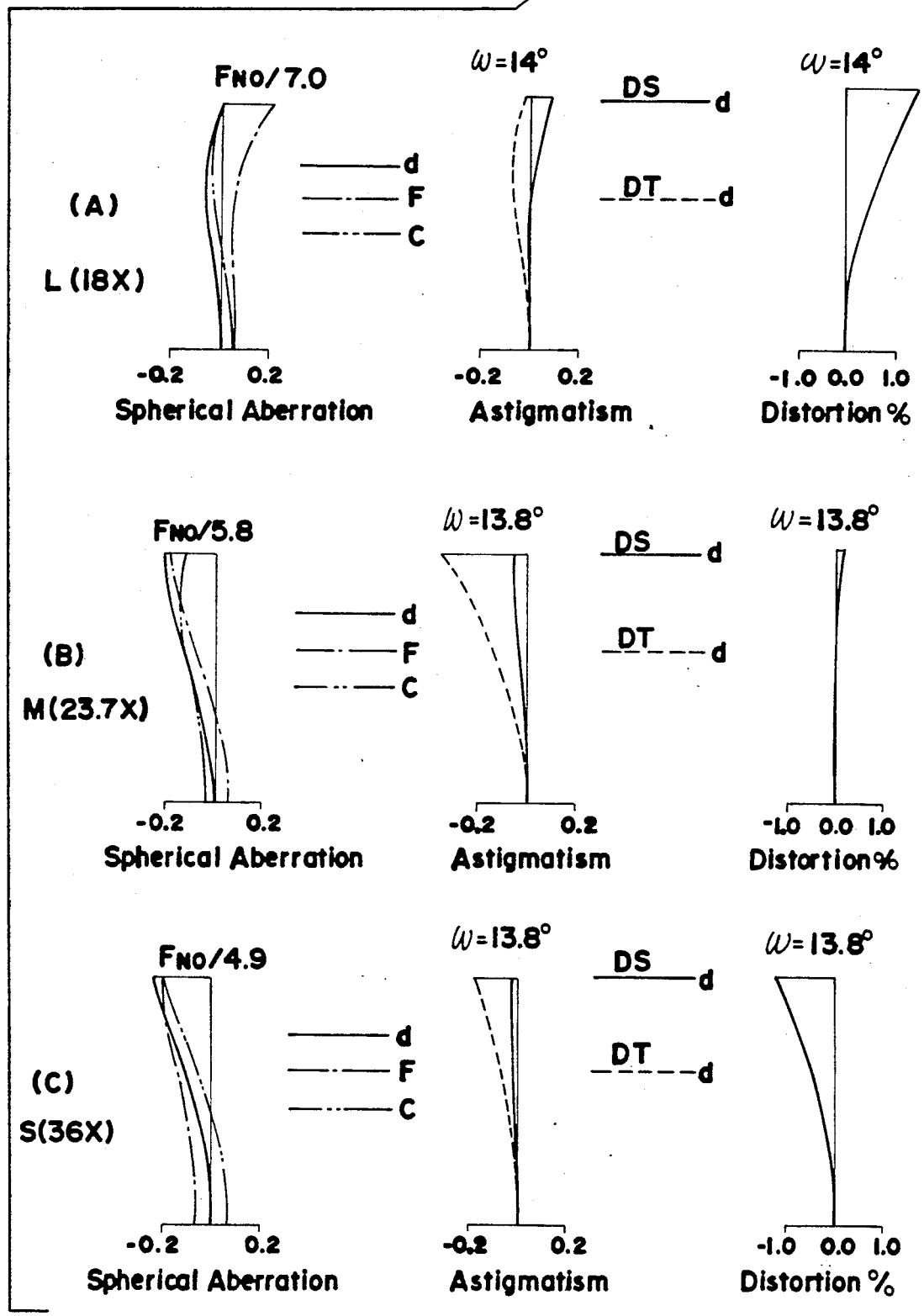

ZOOM LENS SYSTEM

BACKGROUND OF THE INVENTION

1. Field of the Invention

The present invention relates to a zoom lens system having both a negative lens group and a positive lens group for use in reader printers and the like that project enlargements of microfilm images on a screen and can print copies of the said images.

2. Description of the Related Art

Zoom lenses comprising both a negative lens group and a positive lens group are well known in various forms because theirs is the simplest construction. The arrangement of a negative lens on the reducing side of a second positive lens group has been disclosed in Japanese Patent Application No. 54-78150.

The aforesaid lens system is used in a still camera to provide a trimming effect or to widen the field angle.

On the other hand, the zoom lens system of the present invention is a high-magnification 18× to 36× lens for use in microfilm reader printers and the like. Conventional microfilm printers use various exchangeable zoom lens systems having various zoom magnification ranges, and the exchangeable lenses must be compatible with the illumination optical system. Therefore, the lens system to be exchanged must have the pupil position on the reducing side extend toward a position in proximity to the image point on the reducing side. Further, the aforesaid lens system must be compact during the entire zoom range so that it can be inserted in the main unit of a microfilm reader printer.

SUMMARY OF THE INVENTION

Accordingly, a main object of the present invention is to provide a superior zoom lens system capable of eliminating the previously described disadvantages.

A further object of the present invention is to provide a zoom lens system of simple construction that is capable of eliminating the previously described disadvantages.

A still further object of the present invention is to provide a zoom lens system wherein the pupil position on the reducing side approaches the image point on the reduction side to eliminate the previously described disadvantages.

These and other objects are attained by a zoom lens system comprising, sequentially from the enlarging side,
 a negative lens group including a negative lens having a concave surface facing the reducing side and a positive lens having a convex surface facing the enlarging side,
 and a positive lens group including a positive lens unit of at least one single positive lens having a convex surface facing the enlarging side and a lens having a concave surface facing the reducing side and a double convex lens and a lens having a concave surface facing the enlarging side,
 and wherein said zoom lens system is standardized by a conditional expression so that the pupil position on the reducing side approaches the image point on the reducing side.

BRIEF DESCRIPTION OF THE DRAWINGS

These and other objects or features of the present invention will become apparent from the following description of preferred embodiments thereof taken in conjunction with the accompanying drawings, in which:

FIGS. 6, 7, 8 and 9 are illustrations showing aberration curves for the aforesaid first, second, third and fourth embodiments, respectively.

In the following description, like parts are designated by like reference numbers throughout the several drawings.

DESCRIPTION OF THE PREFERRED EMBODIMENTS

Figure 1:
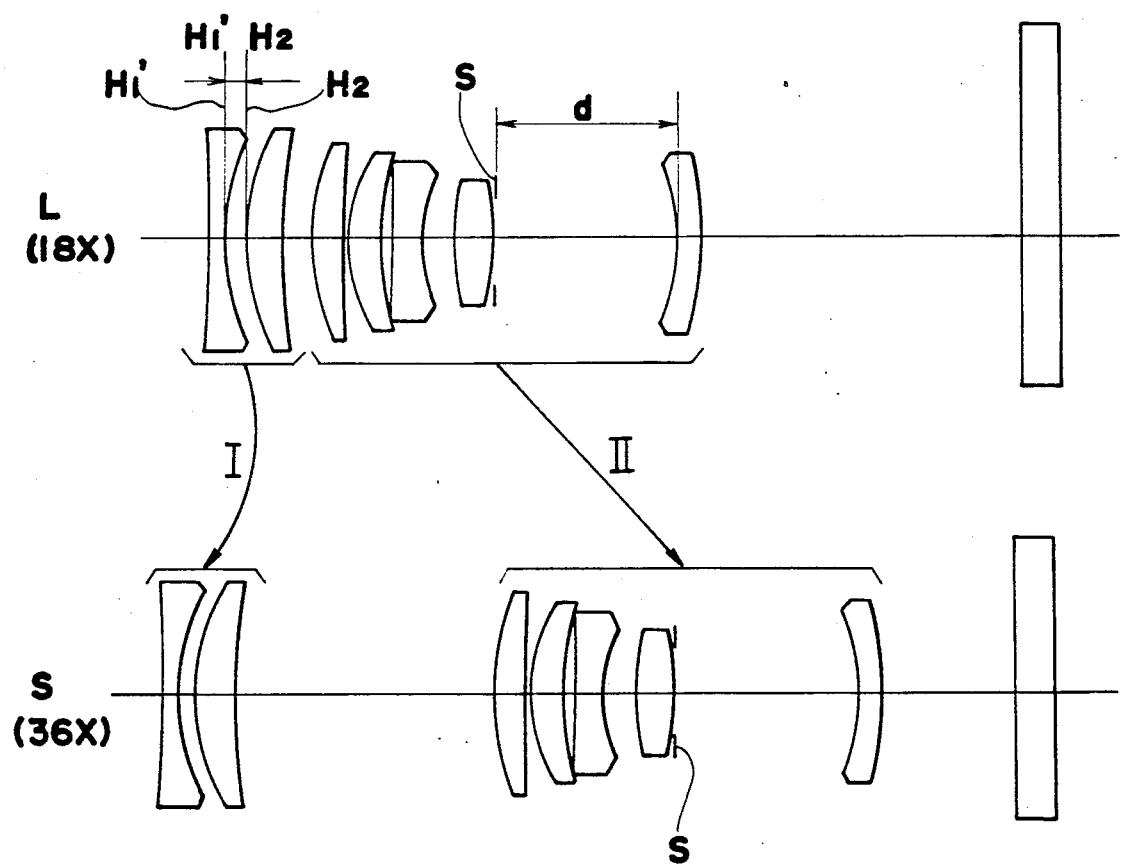
FIG. 1 is an illustration showing the construction of the zoom lens system of the present invention.
Figure 2:
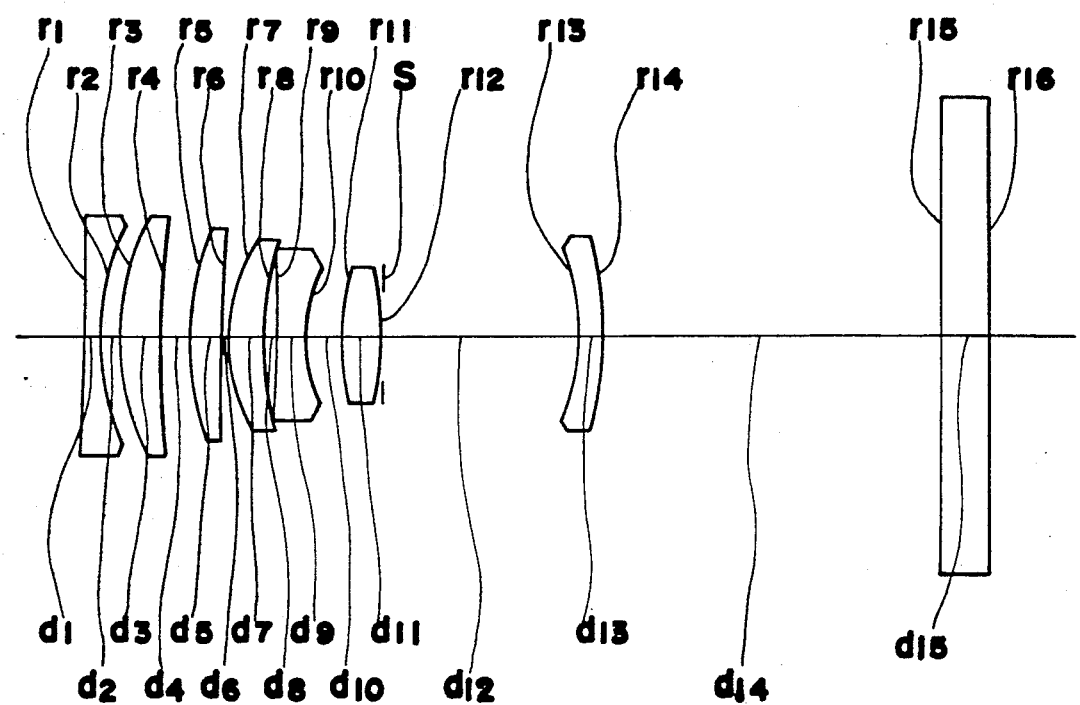
FIGS. 2, 3, 4 and 5 are illustrations showing the lens constructions of first, second, third and fourth embodiments, respectively.
Figure 3:
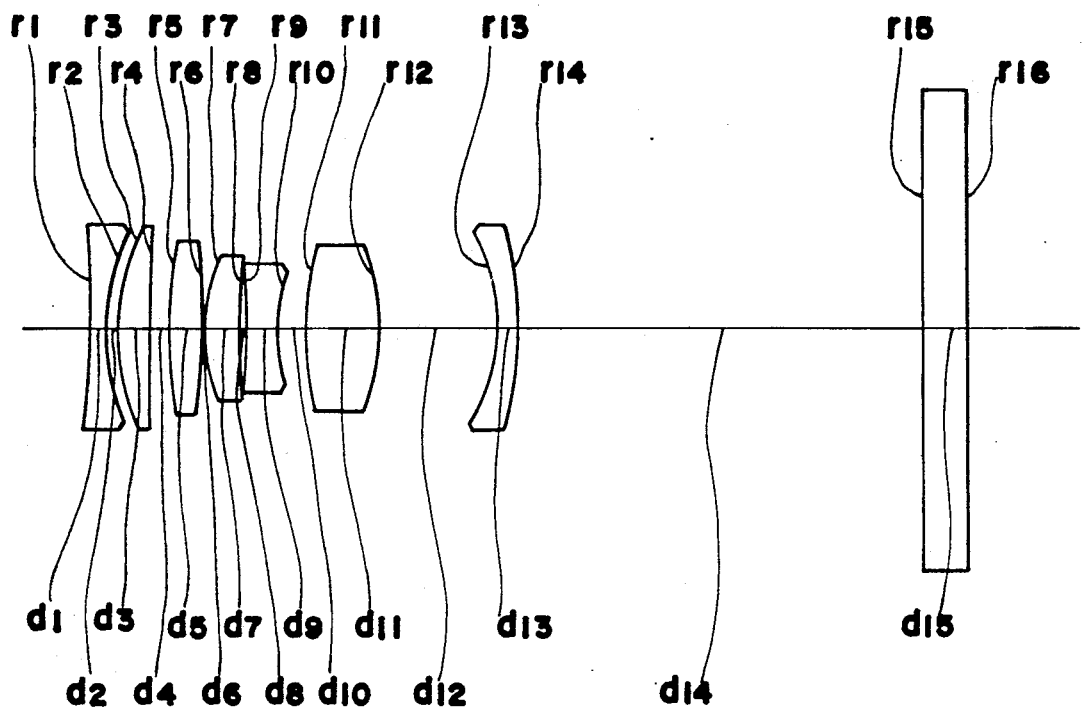
Figure 4:
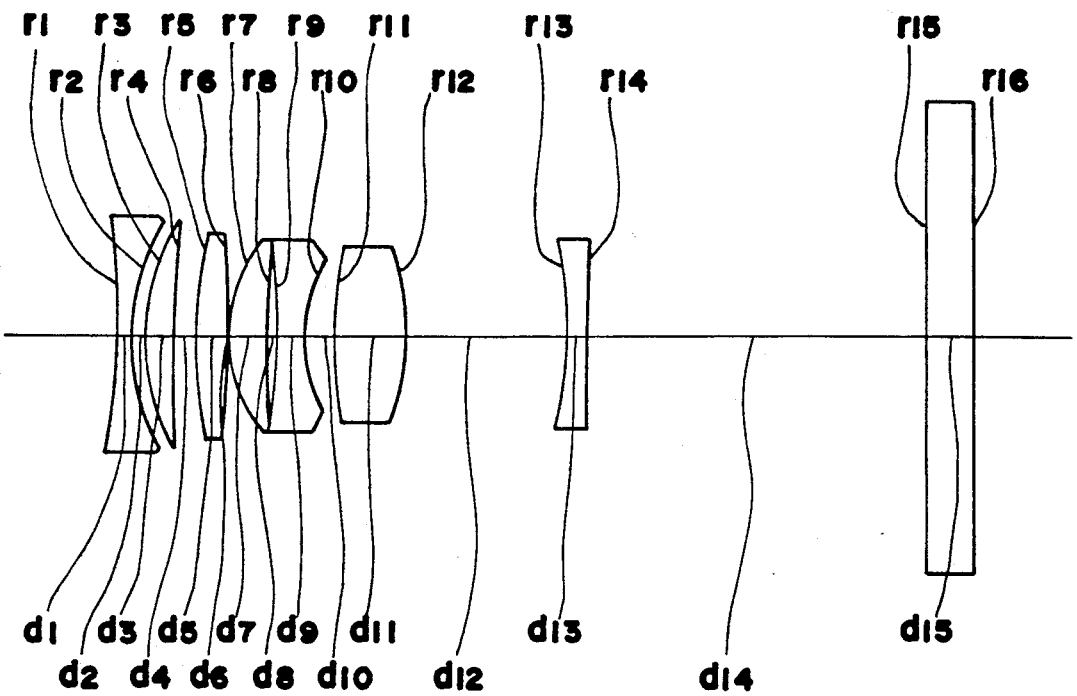
Figure 5:
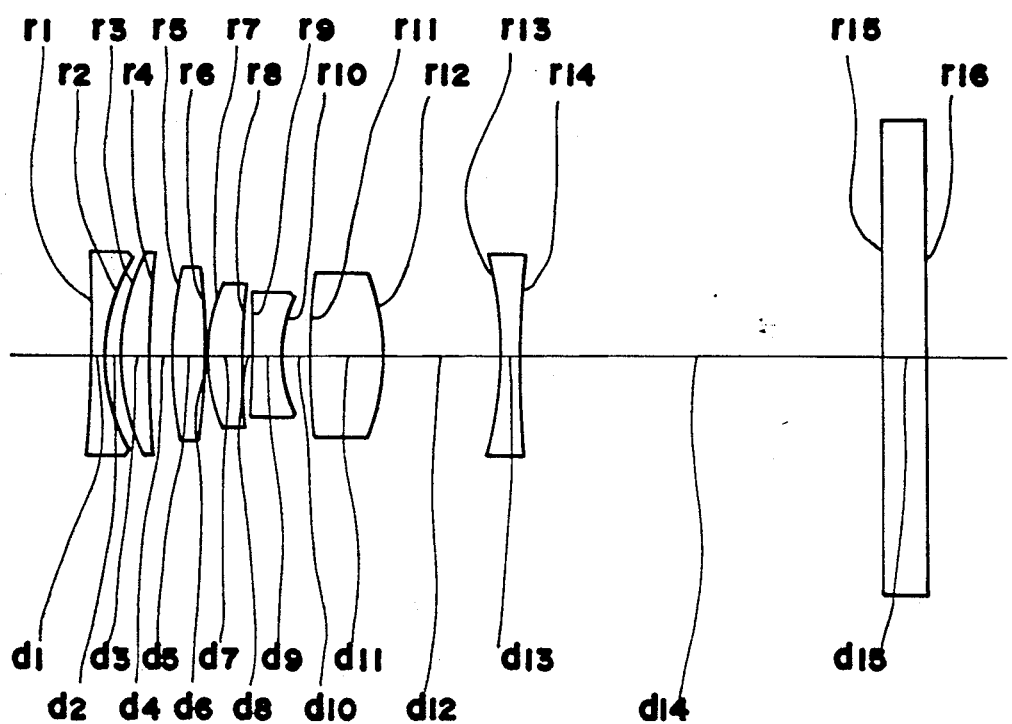
Figure 6:
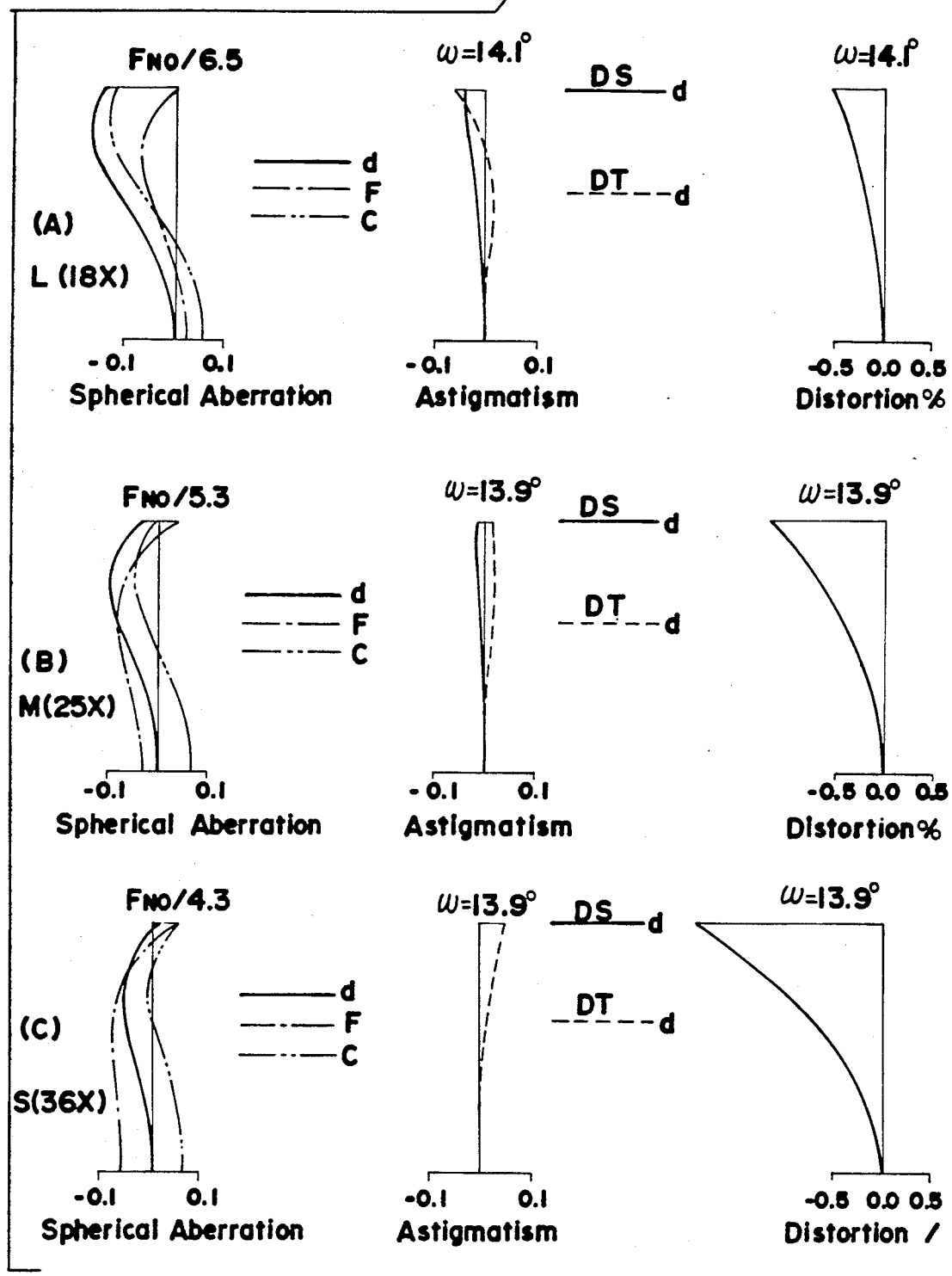
Figure 7:
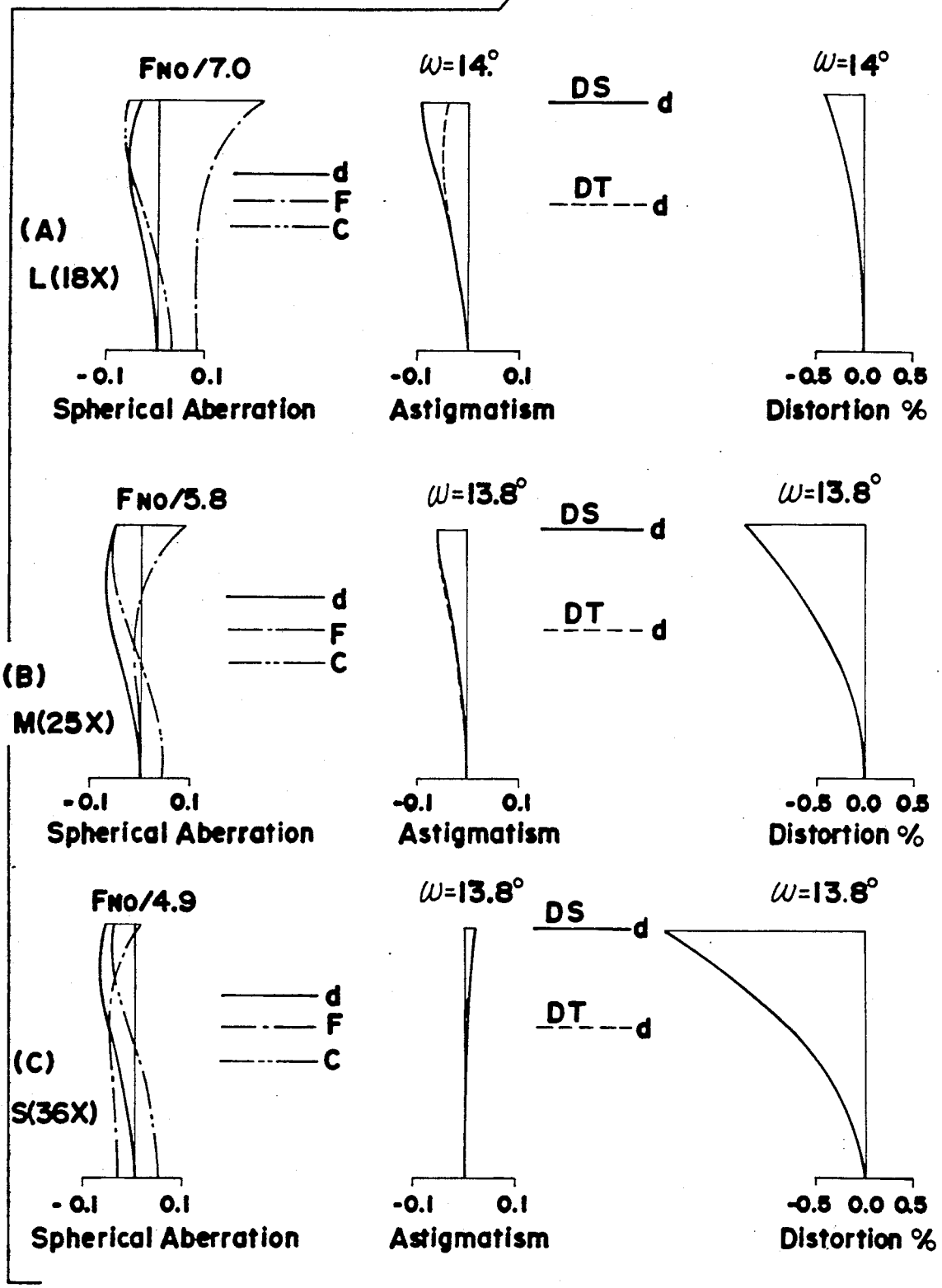

The preferred embodiments of the present invention are described hereinafter with reference to the accompanying drawings. FIG. 1 is a section view showing the construction of the zoom lens system comprising, on the left side, a negative front lens group I on the enlarging side, and, on the right side, a positive back lens group II on the reducing side. The parallel flat-plane plate on the right side is a microfilm cover glass.

Front lens group I comprises a negative first lens having a strongly concave surface facing the reducing side on the right, and a positive second lens having a strongly convex surface facing the enlarging side.

Back lens group II comprises a positive third lens having a strongly convex surface facing the enlarging side, a positive fourth lens having a strongly convex surface similarly facing the enlarging side, a negative fifth lens having a strongly concave surface facing the reducing side, a biconvex sixth lens, and a negative seventh lens having a strongly concave surface facing the reducing side. Back lens group II moves in simple reciprocation from the maximum focal length end (L-end) to the minimum focal length end (S-end) when magnification is varied.

On the other hand, front lens group I accomplishes zooming by moving from the L-end toward the S-end when varying magnification, such that said front lens group I travels away from back lens group II.

Front lens group I performs the role of a compensator comprising a negative and positive lens. Front lens group I provides a negative first lens having a strongly concave surface facing the reducing side and a positive second lens having a strongly convex surface facing the enlarging side so as to form a concentric configuration relative to a stop S positioned within back lens group II to benefit correction of extra-axial aberration.

Back lens group II forms an Ernoster type group excluding the negative seventh lens on the far reducing side. Back lens group II is formed so as to allow easy aberration correction for axial aberration at any bright f-number.

Further, the reduced spacing (space between the main flat-plane $H_1$ on the back side of front lens group I and the main flat-plane $H_2$ on the front side of back lens group II) $H_1' H_2$ of front lens group I and back lens group II minimized by positioning a strong convergent lens group on the enlarging side of back lens group II, so as to minimize the amount of movement of each lens group in the two-power zoom range of 18× to 36×. Since the lens system is constructed so that paraxial magnification around positive lens group II is $-1.28\times$ to $-0.64\times$ and includes equal magnification and negative front lens group I returns in accordance with variable magnification, the overall length of the lens system is reduced throughout the entire range of variable magnification.

A further characteristics of the present invention is that the zoom lens system is constructed so that the pupil position on the reducing side is at a position approaching the image point on the reducing side.

Lens systems used in microfilm reader-printers commonly have a projecting lens for the microfilm and a Keller illuminating condenser lens. The projecting lens system of the present invention is interchangeably usable with a high magnification lens series equal to or greater than 18× to 36×. That is, the present invention may use a lens system having a focal length equal to the projecting lens system of the present invention or a lens system having a focal length shorter than the previously described lens system. Accordingly, the lens system of the present invention must provide a reducing side pupil position (reducing side image point equals the film surface as standard) closely proportional to the focal length. Therefore, in the projecting lens system of the present invention having the longest focal length, the pupil position on the reducing side must be positioned in relative proximity to the film surface to provide a common illuminating optical system for the aforesaid lenses.

In order to realize the previously described characteristics, a negative lens is disposed on the reducing side of positive back lens group II, so as to enlarge the extra-axial main ray angle and bring the pupil position near the film surface.

In the projecting lens system of the present invention, when the overall focal length at the maximum focal length end is designated $f_L$, the focal length of the positive back lens group II is designated $f_{II}$, and the air space between the biconvex lens and the neighboring concave lens on the reducing side in positive second lens group II is designated d, it is desirable that the following conditions obtain:

$$0.35 < f_{II}/f_L < 0.55 \quad (1)$$

$$0.1 < d/f_L < 0.5 \quad (2)$$

Condition (1) shortens the overall length of the lens and sets a suitable travel distance during zooming. When the upper limit of condition (1) is exceeded, the travel distance becomes too great and makes it difficult to assure the 18× to 36× magnification range. Further, when the value is less than the lower limit, the overall length of the lens is increased such that the number of lenses in back lens group II must be increased, thereby increasing the effects of manufacturing error in the lenses.

Condition (2) reduces the overall length of the lens for telephoto type configurations at the maximum focal length end (L-end). When the upper limit is exceeded, it is difficult to guarantee the lens back at the minimum focal length end (S-end). Further, when the value is less then the lower limit value, the effect achieved by positioning the pupil position in proximity to the film surface is reduced, thereby adversely affecting an object of the invention achieved by the pupil positioning effect, to wit, sacrificing compactness of the lens system.

The constructions of examples 1 through four of the present invention are shown in FIGS. 2 through 5; parameters of all lenses are shown in Tables 1 through 4. The parameters disclosed in the tables include, from the enlarging side of the screen, numerical values for radii of curvature: $r_1, r_2, r_2, \ldots r_n$; spacing on the axis: $d_1, d_2, \ldots d_n$; refractive indices on the D-line: $N_1, N_2, \ldots N_n$; Abbe numbers $v_1, v_2, \ldots v_n$ of the film holder.

Further, aberration curves for examples 1 through 4 are shown in FIGS. 6 through 9. In the aforesaid drawings, (A), (B) and (C) indicate the spherical aberration, astigmatism and distortion at the maximum focal length end (L-end) 18×, intermediate position (M-end) 25× or 23.7×, and minimum focal length end (S-end).

Table 5 shows the numerical values for the previously described conditional equations pertaining to examples 1 through 4.

TABLE 1

| \multicolumn{8}{c}{f = 44.6–33.0–23.3, f-number = 6.5–5.3–4.3} |
|---|

| Radius of curvature | | Spacing on axis | | Refractive index (Nd) | | Abbe No. (vd) | |
|---|---|---|---|---|---|---|---|
| $r_1$ | −178.16 | $d_1$ | 1.0 | $N_1$ | 1.7883 | $v_1$ | 47.3 |
| $r_2$ | 15.00 | $d_2$ | 1.6 | | | | |
| $r_3$ | 16.24 | $d_3$ | 2.7 | $N_2$ | 1.6830 | $v_2$ | 31.5 |
| $r_4$ | 50.96 | $d_4$ | 2.1–8.5–18.9 | | | | |
| $r_5$ | 18.26 | $d_5$ | 2.2 | $N_3$ | 1.6700 | $v_3$ | 47.2 |
| $r_6$ | 288.26 | $d_6$ | 0.4 | | | | |
| $r_7$ | 10.96 | $d_7$ | 2.5 | $N_4$ | 1.7200 | $v_4$ | 52.1 |
| $r_8$ | 23.75 | $d_8$ | 0.6 | | | | |
| $r_9$ | 701.39 | $d_9$ | 2.2 | $N_5$ | 1.8052 | $v_5$ | 25.4 |
| $r_{10}$ | 9.24 | $d_{10}$ | 2.5 | | | | |
| $r_{11}$ | 18.96 | $d_{11}$ | 2.8 | $N_6$ | 1.5657 | $v_6$ | 43.0 |
| $r_{12}$ | −23.96 | $d_{12A}$ | 0.0 | | | | |
| S-stop | | $d_{12B}$ | 13.5 | | | | |
| $r_{13}$ | −13.37 | $d_{13}$ | 1.7 | $N_7$ | 1.4931 | $v_7$ | 83.6 |
| $r_{14}$ | −24.20 | $d_{14}$ | 22.8–15.2–9.1 | | | | |
| $r_{15}$ | ∞ | $d_{15}$ | 3.0 | $N_8$ | 1.5168 | $v_8$ | 64.2 |
| $r_{16}$ | ∞ | | | | | | |

Σd = 61.5–60.4–64.7

TABLE 2

| \multicolumn{8}{c}{f = 44.8–33.2–23.4, f-number = 7.0–5.8–4.9} |
|---|

| Radius of curvature | | Spacing on axis | | Refractive index (Nd) | | Abbe No. (vd) | |
|---|---|---|---|---|---|---|---|
| $r_1$ | −62.87 | $d_1$ | 1.0 | $N_1$ | 1.7856 | $v_1$ | 42.8 |
| $r_2$ | 14.46 | $d_2$ | 1.0 | | | | |
| $r_3$ | 15.52 | $d_3$ | 2.0 | $N_2$ | 1.6734 | $v_2$ | 29.3 |
| $r_4$ | 98.94 | $d_4$ | 1.5–7.1–16.1 | | | | |
| $r_5$ | 40.76 | $d_5$ | 2.2 | $N_3$ | 1.7883 | $v_3$ | 47.3 |
| $r_6$ | −75.79 | $d_6$ | 0.2 | | | | |
| $r_7$ | 10.26 | $d_7$ | 2.5 | $N_4$ | 1.6935 | $v_4$ | 50.3 |
| $r_8$ | 41.10 | $d_8$ | 0.5 | | | | |
| $r_9$ | −116.12 | $d_9$ | 2.0 | $N_5$ | 1.8052 | $v_5$ | 25.4 |
| $r_{10}$ | 9.95 | $d_{10}$ | 2.0 | | | | |
| $r_{11}$ | 22.85 | $d_{11}$ | 5.0 | $N_6$ | 1.5657 | $v_6$ | 43.0 |
| $r_{12}$ | −16.60 | $d_{12}$ | 8.0 | | | | |
| $r_{13}$ | −12.60 | $d_{13}$ | 1.4 | $N_7$ | 1.6180 | $v_7$ | 63.4 |
| $r_{14}$ | −29.80 | $d_{14}$ | 27.5–19.8–13.6 | | | | |
| $r_{15}$ | ∞ | $d_{15}$ | 3.0 | $N_8$ | 1.5168 | $v_8$ | 64.2 |
| $r_{16}$ | ∞ | | | | | | |

Σd = 59.8–57.7–60.5

TABLE 3

| \multicolumn{8}{c}{f = 44.8–35.2–23.5, f-number = 6.5–5.5–4.3} |
|---|

| Radius of curvature | | Spacing on axis | | Refractive index (Nd) | | Abbe No. (vd) | |
|---|---|---|---|---|---|---|---|
| $r_1$ | −64.33 | $d_1$ | 1.0 | $N_1$ | 1.7856 | $v_1$ | 42.8 |
| $r_2$ | 14.22 | $d_2$ | 1.0 | | | | |
| $r_3$ | 15.42 | $d_3$ | 2.0 | $N_2$ | 1.6734 | $v_2$ | 29.3 |
| $r_4$ | 99.71 | $d_4$ | 1.5–5.6– | | | | |

TABLE 3-continued f = 44.8-35.2-23.5, f-number = 6.5-5.5-4.3

| Radius of curvature | | Spacing on axis | | Refractive index (Nd) | | Abbe No. (νd) |
|---|---|---|---|---|---|---|
| | | | 15.0 | | | |
| $r_5$ | 32.50 | $d_5$ | 2.2 | $N_3$ 1.7170 | $v_3$ | 47.9 |
| $r_6$ | −70.42 | $d_6$ | 0.2 | | | |
| $r_7$ | 9.86 | $d_7$ | 2.5 | $N_4$ 1.6584 | $v_4$ | 50.9 |
| $r_8$ | 37.80 | $d_8$ | 0.5 | | | |
| $r_9$ | −118.78 | $d_9$ | 2.0 | $N_5$ 1.8052 | $v_5$ | 25.4 |
| $r_{10}$ | 9.24 | $d_{10}$ | 2.0 | | | |
| $r_{11}$ | 25.41 | $d_{11}$ | 5.0 | $N_6$ 1.5762 | $v_6$ | 41.4 |
| $r_{12}$ | −15.48 | $d_{12}$ | 11.0 | | | |
| $r_{13}$ | −24.52 | $d_{13}$ | 1.4 | $N_7$ 1.6180 | $v_7$ | 63.4 |
| $r_{14}$ | 157.92 | $d_{14}$ | 23.3−17.2−10.1 | | | |
| $r_{15}$ | ∞ | $d_{15}$ | 3.0 | $N_8$ 1.5168 | $v_8$ | 64.2 |
| $r_{16}$ | ∞ | | | | | |

$\Sigma d = 58.6-56.5-58.9$

TABLE 4 f = 44.8-33.2-23.5, f-number = 7.0-5.8-4.9

| Radius of curvature | | Spacing on axis | | Refractive index (Nd) | | Abbe No. (νd) |
|---|---|---|---|---|---|---|
| $r_1$ | −89.39 | $d_1$ | 1.0 | $N_1$ 1.7856 | $v_1$ | 42.8 |
| $r_2$ | 13.24 | $d_2$ | 1.0 | | | |
| $r_3$ | 14.63 | $d_3$ | 2.0 | $N_2$ 1.6733 | $v_2$ | 29.2 |
| $r_4$ | 71.38 | $d_4$ | 1.5−6.3−14.1 | | | |
| $r_5$ | 29.20 | $d_5$ | 2.2 | $N_3$ 1.7883 | $v_3$ | 47.3 |
| $r_6$ | −71.67 | $d_6$ | 0.2 | | | |
| $r_7$ | 10.02 | $d_7$ | 2.5 | $N_4$ 1.6935 | $v_4$ | 50.2 |
| $r_8$ | 41.18 | $d_8$ | 0.5 | | | |
| $r_9$ | −216.83 | $d_9$ | 2.0 | $N_5$ 1.8051 | $v_5$ | 25.4 |
| $r_{10}$ | 8.77 | $d_{10}$ | 2.0 | | | |
| $r_{11}$ | 33.14 | $d_{11}$ | 5.0 | $N_6$ 1.5656 | $v_6$ | 43.0 |
| $r_{12}$ | −14.79 | $d_{12}$ | 8.0 | | | |
| $r_{13}$ | −24.47 | $d_{13}$ | 1.4 | $N_7$ 1.6180 | $v_7$ | 63.3 |
| $r_{14}$ | 87.91 | $d_{14}$ | 24.4−17.0−11.2 | | | |
| $r_{15}$ | ∞ | $d_{15}$ | 3.0 | $N_8$ 1.5168 | $v_8$ | 64.2 |
| $r_{16}$ | ∞ | | | | | |

$\Sigma d = 56.7-54.2-56.0$

TABLE 5

| Example | 1 | 2 | 3 | 4 |
|---|---|---|---|---|
| $f_{II}/f_L$ | 0.479 | 0.450 | 0.422 | 0.407 |
| $d/f_L$ | 0.303 | 0.179 | 0.246 | 0.179 |
| $TL_\infty/f_L$ | 1.32 | 1.30 | 1.25 | 1.21 |

Pursuant to the preceding description, the zoom lens system of the present invention is a simple zoom lens system having a negative-positive two-group construction which provides a two-power zoom ratio (18× to 36×) at low cost with 100% aperture efficiency and excellent aberration correction. The zoom lens system of the present invention has been designed to realize a common illuminating optical system capable of using the aforesaid lens system with a high magnification lens group.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A zoom lens system comprising, in order from the enlarging side:
    a negative lens group including a negative lens having a concave surface facing the reducing side and a positive lens having a convex surface facing the enlarging side; and
    a positive lens group including a positive lens unit of at least one single positive lens having a convex surface facing the enlarging side, a first lens having a concave surface facing the reducing side, a double convex lens, and a second lens having a concave surface facing the enlarging side;
    wherein said zoom lens system satisfies the following conditional expression:

$0.35 < f_{II}/F_L < 0.55$ $0.10 < d/f_L < 0.50$ wherein $F_{II}$ is a focal length of said positive lens group, $F_L$ is an overall focal length at the maximum focal length end, and a d is an air space between said double convex lens and said second lens.

2. A zoom lens system as claimed in claim 1, wherein said second lens is a negative meniscus lens having a concave surface facing the enlarging side.

3. A zoom lens system as claimed in claim 1, wherein said second lens is a double concave lens.

* * * * *